(12) United States Patent
Oonishi

(10) Patent No.: US 12,474,693 B2
(45) Date of Patent: Nov. 18, 2025

(54) SPEED ADJUSTMENT DEVICE

(71) Applicant: FANUC CORPORATION, Yamanashi (JP)

(72) Inventor: Nobuhito Oonishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 398 days.

(21) Appl. No.: 18/042,967

(22) PCT Filed: Aug. 20, 2021

(86) PCT No.: PCT/JP2021/030547
§ 371 (c)(1),
(2) Date: Feb. 24, 2023

(87) PCT Pub. No.: WO2022/044989
PCT Pub. Date: Mar. 3, 2022

(65) Prior Publication Data
US 2023/0297078 A1    Sep. 21, 2023

(30) Foreign Application Priority Data
Aug. 25, 2020    (JP) .................................. 2020-141851

(51) Int. Cl.
*G05B 19/416*    (2006.01)
*B23Q 15/08*    (2006.01)

(52) U.S. Cl.
CPC ........... *G05B 19/416* (2013.01); *B23Q 15/08* (2013.01)

(58) Field of Classification Search
None
See application file for complete search history.

(56) References Cited

U.S. PATENT DOCUMENTS

2020/0159190 A1*    5/2020    Oota .................... G05B 19/416

FOREIGN PATENT DOCUMENTS

| CN | 203418368 U | 2/2014 |
|---|---|---|
| CN | 205324792 U | 6/2016 |

(Continued)

OTHER PUBLICATIONS

International Search Report issued in PCT/JP2021/030547; mailed Nov. 2, 2021.

*Primary Examiner* — Ryan A Jarrett
(74) *Attorney, Agent, or Firm* — Studebaker Brackett PLLC

(57) ABSTRACT

Provided is a technique that enables appropriate speed adjustment in a speed-adjusted section and inhibition of burring and tool damage without unduly extending cycle time. A speed adjustment device according to the present invention is provided with: a storage unit that stores a calculation method for an adjusted speed of a driving axis in a speed-adjusted section, the adjusted speed being determined in accordance with a tool being used, the shape of a workpiece in the speed-adjusted section, and path information; a speed-adjusted section identification unit that identifies the speed-adjusted section and the shape of the workpiece in the speed-adjusted section on the basis of shape data of the workpiece and the path information; and an adjusted speed calculation unit that determines the calculation method for the adjusted speed of the driving axis in the speed-adjusted section on the basis of tool data, the shape of the workpiece in the identified speed-adjusted section, the path information, and stored information that is stored in the storage unit, and calculates the adjusted speed in the speed-adjusted section on the basis of the determined calculation method.

4 Claims, 4 Drawing Sheets

(56) References Cited

FOREIGN PATENT DOCUMENTS

| | | | |
|---|---|---|---|
| CN | 106557075 | A | 4/2017 |
| CN | 111290332 | A | 6/2020 |
| JP | 2000-3213 | A | 1/2000 |
| JP | 2003-256010 | A | 9/2003 |
| JP | 2003-308104 | A | 10/2003 |
| JP | 2003-345408 | A | 12/2003 |
| JP | 2018-060500 | A | 4/2018 |
| JP | 2020-086485 | A | 6/2020 |

* cited by examiner

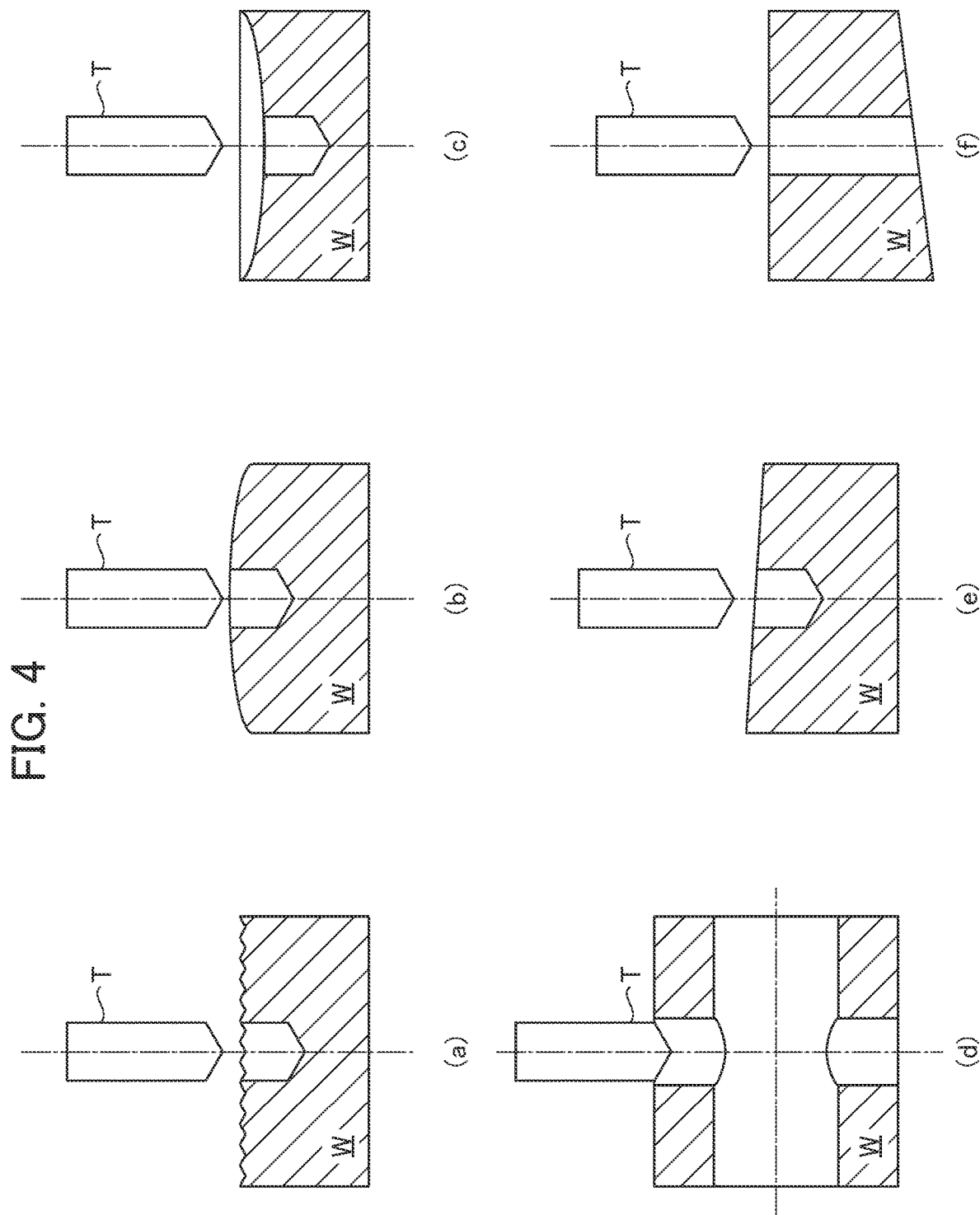

SPEED ADJUSTMENT DEVICE

TECHNICAL FIELD

The present invention relates to a speed adjustment device.

BACKGROUND ART

FIGS. 1 and 2 illustrate a conventional common drilling process. As indicated by reference sign (a) in FIG. 1, in this conventional common drilling process, the tool T is initially moved by rapid traverse to a reference point (hereafter referred to as the point R), which is the starting position for drilling. Next, as indicated by reference signs (b) to (d) in FIG. 1, the tool T is moved at a feedrate for cutting feed from the point R until reaching a hole bottom. That is to say, the feedrate is constant from a bite portion at a moment of contact of the tool T with the workpiece W (see FIG. 1 (b)), to a drilling operation after the contact (see FIG. 1 (c)). In a case where the hole is a through-hole, the feedrate is constant at the breakthrough portion at a moment of opening the hole (see FIG. 1 (d)) as well.

However, there is a risk that damage may occur to the tool T upon contact of the tool T with the workpiece W in the bite portion illustrated in FIG. 1 (b), as illustrated in FIG. 2 (a). In addition, there is a risk that the position of the hole may be deviated and machining accuracy may deteriorate, as illustrated in FIG. 2 (b). Likewise, there is a risk that damage may occur to the tool T in the breakthrough portion illustrated in FIG. 1 (d) as well, as illustrated in FIG. 2 (c). In addition, burrs are likely to occur, as illustrated in FIG. 2 (d).

In order to address these problems, the feedrate for the cutting feed may be decreased. However, this causes another problem to occur, in that cycle time may be extended because of the decrease in the feedrate for the drilling operation illustrated in FIG. 1 (c), for which the speed does not need to be decreased.

A technique has been proposed for identifying the bite portion and the breakthrough portion on the basis of a spindle load, a setting value, and a program (point R position), and decreasing the feedrate only in the bite portion and the breakthrough portion (for example, see Patent Document 1). According to this technique, an increase in cycle time can be minimized, while avoiding burrs and tool damage.

Patent Document 1: Japanese Unexamined Patent Application, Publication No. 2020-86485

DISCLOSURE OF THE INVENTION

Problems to be Solved by the Invention

In the technique of Patent Document 1, the bite speed (the feedrate in the bite portion, the same hereafter) and the breakthrough speed (the feedrate in the breakthrough portion, the same hereafter) are set on the basis of a setting value or a machining program command. However, the optimal bite speed and breakthrough speed change depending on the workpiece surface shape, such as irregularities and inclination of the workpiece surface, and the type of tool. Therefore, it was difficult to set an optimal bite speed and breakthrough speed for all drilling processes.

There is therefore a demand for a technique that enables appropriate speed adjustment in a section where speed adjustment is required and inhibition of burring and tool damage without unduly extending cycle time.

Means for Solving the Problems

An aspect of the present disclosure is a speed adjustment device for adjusting a speed of a driving axis of a machine tool that performs machining of a workpiece using a tool. The speed adjustment device is provided with a storage unit that stores a calculation method for an adjusted speed of the driving axis in a speed-adjusted section, the adjusted speed being determined in accordance with a tool being used, the shape of a workpiece in the speed-adjusted section, and path information, a speed-adjusted section identification unit that identifies the speed-adjusted section and the shape of the workpiece in the speed-adjusted section on the basis of shape data of the workpiece and the path information, and an adjusted speed calculation unit that determines the calculation method for the adjusted speed of the driving axis in the speed-adjusted section on the basis of tool data, the shape of the workpiece in the speed-adjusted section identified by the speed-adjusted section identification unit, the path information, and stored information that is stored in the storage unit, and calculates the adjusted speed in the speed-adjusted section on the basis of the determined calculation method.

Effects of the Invention

According to an aspect of the present disclosure, appropriate speed adjustment in a section where speed adjustment is required can be done, and burring and tool damage can be inhibited without unduly extending cycle time.

BRIEF DESCRIPTION OF THE DRAWINGS

FIG. 4 illustrates a drilling process when a workpiece surface has irregularities or is inclined.

PREFERRED MODE FOR CARRYING OUT THE INVENTION

An embodiment of the present disclosure is described below with reference to the drawings.

A speed adjustment device 1 according to an embodiment of the present disclosure adjusts the speed of a driving axis of a machine tool, which performs machining of a workpiece W using a tool T, in a section where speed adjustment is required (hereafter referred to as "speed-adjusted section"). More specifically, the speed adjustment device 1 according to the present embodiment, for example, adjusts the speed of the driving axis of the machine tool, which performs machining of the workpiece W using a drill as the tool T, in a bite portion and a breakthrough portion as the speed-adjusted sections.

The speed adjustment device 1 according to the present embodiment has a hardware configuration including, inter alia, a CPU, a ROM, a RAM, a non-volatile memory, a bus, an axis control circuit, a servo amplifier, and an interface, none of which are illustrated. In addition, servo motors 20, an input/output device, etc. are connected to the speed adjustment device 1 according to the present embodiment.

Figure 1:
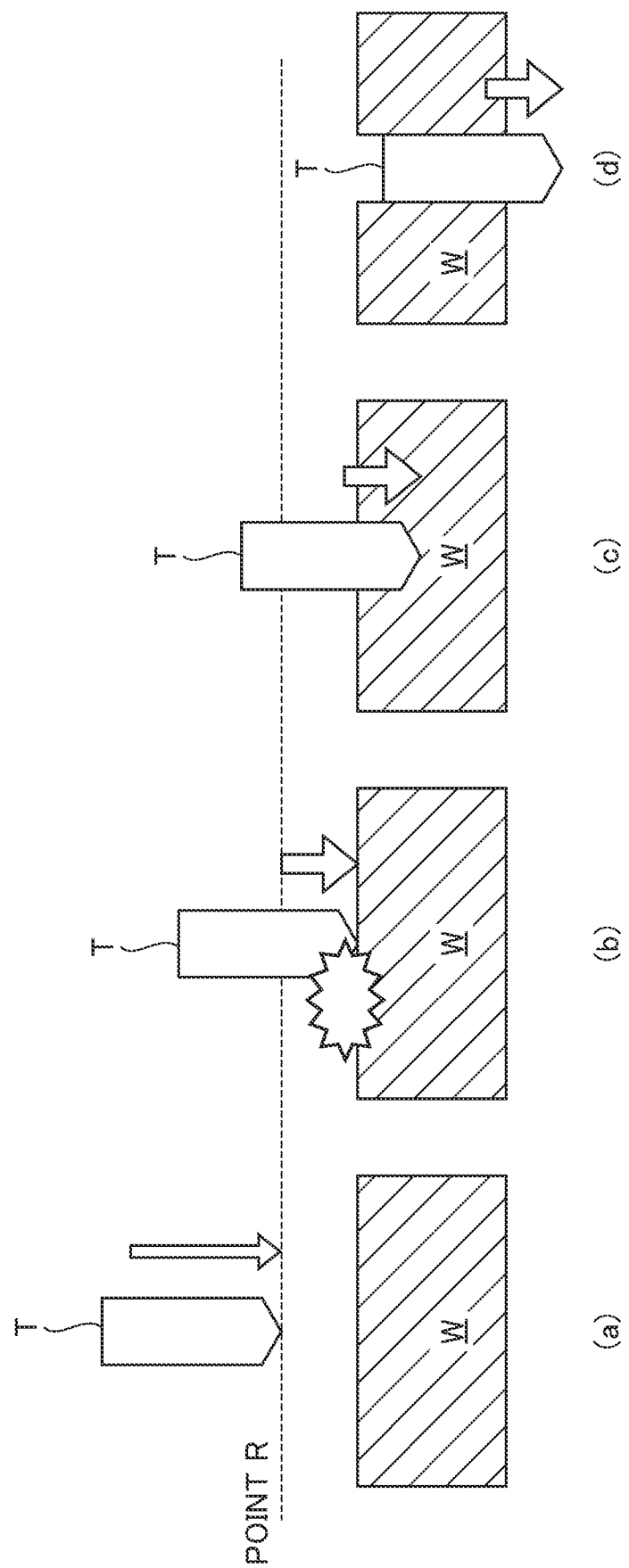
FIG. 1 illustrates a conventional common drilling process.
Figure 2:
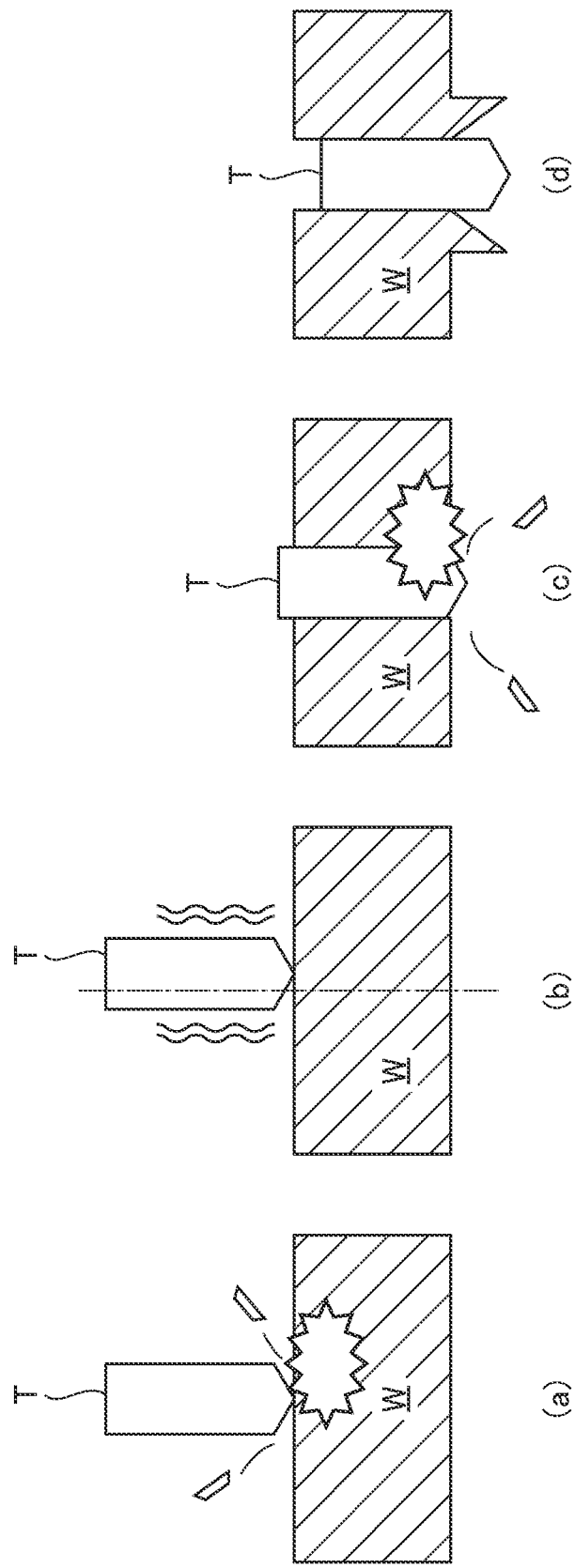
FIG. 2 illustrates a conventional common drilling process.
Figure 3:
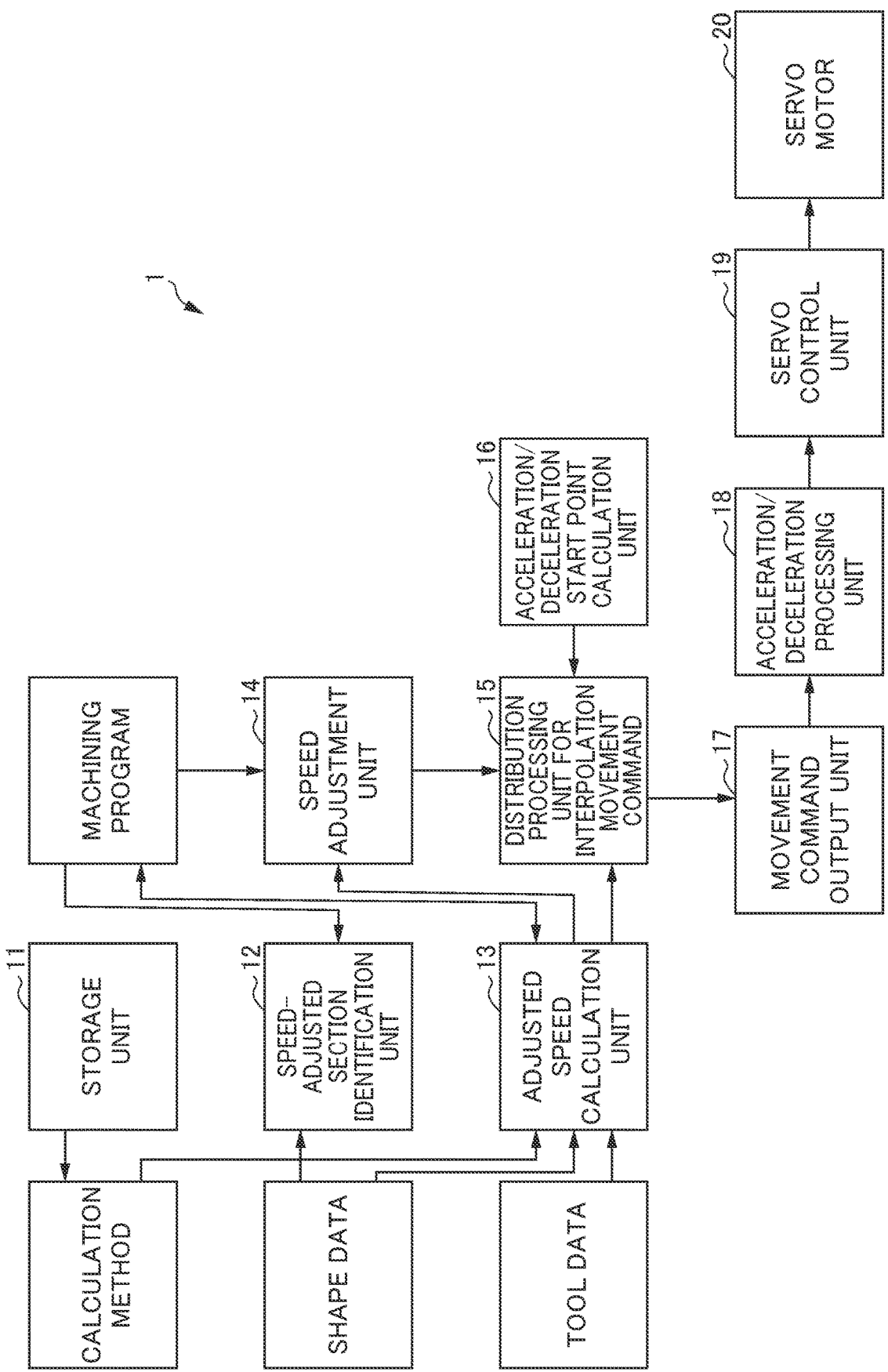
FIG. 3 is a block diagram illustrating a functional configuration of a speed adjustment device according to an embodiment of the present disclosure.

FIG. 3 is a block diagram illustrating the functional configuration of the speed adjustment device 1 according to the present embodiment. As illustrated in FIG. 3, the speed adjustment device 1 according to the present embodiment is provided to a numerical control device that outputs a movement command on the basis of a machining program, and performs machining of the workpiece W by drivingly controlling the servo motors 20 of the driving axes of the machine tool on the basis of the movement command.

As illustrated in FIG. 3, the speed adjustment device 1 according to the present embodiment is provided with a storage unit 11, a speed-adjusted section identification unit 12, an adjusted speed calculation unit 13, a speed adjustment unit 14, a distribution processing unit 15 for interpolation movement command, an acceleration/deceleration start position calculation unit 16, a movement command output unit 17, an acceleration/deceleration processing unit 18, and a servo control unit 19.

Here, FIG. 4 illustrates a drilling process when the workpiece surface has irregularities or is inclined. FIG. 4 (a) illustrates when the bite portion has a plurality of irregularities, FIG. 4 (b) illustrates when the bite portion has a convex curved shape, FIG. 4 (c) illustrates when the bite portion has a concave curved shape, FIG. 4 (d) illustrates when the portion where the machining path and a hollow part in a cylindrical workpiece W (a bite portion and a breakthrough portion inside the workpiece W) is curved, FIG. 4 (e) illustrates when the bite portion is an inclined surface, and FIG. 4 (f) illustrates when the breakthrough portion is an inclined surface.

As illustrated in FIG. 4 (a) to (f), when the bite portion or the breakthrough portion of the workpiece W have irregularities or are inclined, the appropriate bite speed and breakthrough speed vary depending on the irregularities and the inclination. Therefore, when only setting the bite speed and the breakthrough speed on the basis of a setting value or a machining program command, as in the conventional technique, reliably inhibiting burrs and tool damage is impossible.

In this regard, in addition to the tool being used and path information, the speed adjustment device 1 according to the present embodiment adjusts the bite speed and the breakthrough speed in accordance with the shape of the bite portion and the breakthrough portion as the speed-adjusted section. That is to say, the speed adjustment device 1 according to the present embodiment adjusts the bite speed and the breakthrough speed on the basis of the surface shape such as irregularities and inclination of the bite portion and the breakthrough portion, thereby enabling reliable inhibition of the occurrence of burrs and tool damage in the bite portion and the breakthrough portion.

Returning to FIG. 3, the storage unit 11 stores a calculation method for an adjusted speed of the driving axis in a speed-adjusted section, determined in accordance with the tool being used, the shape of the workpiece in the speed-adjusted section, and the path information. In the present embodiment, the path information may be acquired from the machining program. For example, the storage unit 11 may create a table in which the tool being used, the shape of the workpiece in the speed-adjusted section, and the path information are associated with the calculation method for the adjusted speed of the driving axis in the speed-adjusted section, and store the created table.

In addition, in a case where, for example, the shape of the workpiece in the speed-adjusted section identified by the speed-adjusted section identification unit 12 described below is an inclined surface, and the tool being used is an indexable insert drill, the storage unit 11 may store a calculation method wherein the adjusted speed is set to one third of normal speed when the angle of inclination of the inclined surface is equal to or more than 2 degrees, and the adjusted speed is set to half of normal speed when the angle of inclination of the inclined surface is equal to or less than 2 degrees. Here, "normal speed" is the machining speed that can be acquired from the machining program, and is used as the standard when calculating the adjusted speed.

The speed-adjusted section identification unit 12 identifies the speed-adjusted section and the shape of the workpiece in the speed-adjusted section on the basis of shape data of the workpiece W and the path information. The shape data of the workpiece W is, for example, CAD data of the workpiece W. Instead of CAD data, a captured image of the workpiece W may be used. In the present embodiment, the path information may be acquired from the machining program. The speed-adjusted section is, for example, in a drilling process, the bite portion and the breakthrough portion described above. That is to say, in the case of a drilling process, the speed-adjusted section identification unit 12 identifies the shape of the workpiece in the bite portion and the breakthrough portion.

Specifically, the speed-adjusted section identification unit 12 identifies as the speed-adjusted section the machining path of a drilling cycle in the machining program, and the shape of a surface including an intersection with the machining path if the shape data of the workpiece W is surface information. In this way, the speed-adjusted section identification unit 12 obtains, for example, the angle of inclination (for example, 3 degrees) of the surface identified as the shape of the speed-adjusted section. At this time, if a point R is designated as a standard point in the machining program, the point R may be used instead of the machining path of the drilling cycle. In other words, the shape of a surface including an intersection with a line drawn in the travel direction of the tool T from the point R may be identified as the shape of the speed-adjusted section.

The adjusted speed calculation unit 13 determines a calculation method for the adjusted speed for the driving axis in the speed-adjusted section, on the basis of tool data, the shape of the workpiece in the speed-adjusted section identified by the speed-adjusted section identification unit 12, the path information, and the stored information that is stored in the storage unit 11. As described above, in the present embodiment, the path information may be acquired from the machining program.

In addition, the adjusted speed calculation unit 13 calculates the adjusted speed in the speed-adjusted section identified by the speed-adjusted section identification unit 12, on the basis of the calculation method for the driving axis in the determined speed-adjusted section. In the example of the calculation method as described above, that is to say wherein the adjusted speed of the driving axis in the speed-adjusted section is set to one third of normal speed when the angle of inclination of the inclined surface is equal to or more than 2 degrees, the adjusted speed is the speed that is calculated by multiplying the machining speed prescribed by the machining program by one third. The adjusted speed in the speed-adjusted section calculated in this way is output to the speed adjustment unit 14 described below.

The speed adjustment unit 14 sets the adjusted speed in the speed-adjusted section identified by the speed-adjusted section identification unit 12 to the adjusted speed calculated by the adjusted speed calculation unit 13. In this way, the speed in the speed-adjusted section is automatically adjusted.

The distribution processing unit 15 for interpolation movement command generates interpolation movement commands on the basis of the machining program command that is speed-adjusted by the speed adjustment unit 14, and generates a distribution command for distributing the interpolation movement commands among the driving axes. The generated distribution command is output to the movement command output unit 17 described below.

The acceleration/deceleration start point calculation unit 16 calculates an acceleration/deceleration start point, on the basis of the position of the speed-adjusted section identified by the speed-adjusted section identification unit 12, and the speed and the acceleration prescribed by the machining program command. In addition, the acceleration/deceleration start point calculation unit 16 outputs the calculated acceleration/deceleration start point to the distribution processing unit 15 for interpolation movement command described above. In this way, the movement speed reaches a specified adjusted speed before arrival at the speed-adjusted section.

The movement command output unit 17 generates a movement command for each of the driving axes on the basis of the distribution command generated and output by the distribution processing unit 15 for interpolation movement command. The generated movement commands are output to the acceleration/deceleration processing unit 18 described below.

The acceleration/deceleration processing unit 18 executes an interpolated acceleration/deceleration process on the basis of the movement commands generated and output by the movement command output unit 17.

The servo control unit 19 controls the servo motors 20 provided to the driving axes of the machine tool, on the basis of the movement commands subjected to the acceleration/deceleration process by the acceleration/deceleration processing unit 18.

Described below are the operation and the effect of the speed adjustment device 1 according to the present embodiment being provided with the configuration described above.

As described above, in the present embodiment, there is provided a storage unit 11 that stores a calculation method for an adjusted speed of the driving axis in a speed-adjusted section, determined in accordance with the tool being used, the shape of the workpiece in the speed-adjusted section, and the path information. In addition, there is provided a speed-adjusted section identification unit 12 that identifies the speed-adjusted section and the shape of the workpiece in the speed-adjusted section on the basis of shape data of the workpiece W and the path information. In addition, there is provided an adjusted speed calculation unit 13 that determines a calculation method for the adjusted speed for the driving axis in the speed-adjusted section, on the basis of tool data, the shape of the workpiece in the speed-adjusted section identified by the speed-adjusted section identification unit 12, the path information, and the stored information that is stored in the storage unit 11, and calculates the adjusted speed in the speed-adjusted section on the basis of the determined calculation method. In addition, there is provided a speed adjustment unit 14 that sets the adjusted speed in the speed-adjusted section identified by the speed-adjusted section identification unit 12 to the adjusted speed calculated by the adjusted speed calculation unit 13.

Thus, in the speed adjustment device 1 according to the present embodiment, the speed-adjusted section identification unit 12 first identifies the speed-adjusted section and the shape of the workpiece in the speed-adjusted section on the basis of the shape data of the workpiece W and the path information. Next, the adjusted speed calculation unit 13 determines a calculation method for the adjusted speed for the driving axis in the speed-adjusted section, on the basis of tool data, the shape of the workpiece in the identified speed-adjusted section, the path information, and the stored information that is stored in the storage unit 11. In addition, the adjusted speed calculation unit 13 calculates the adjusted speed in the speed-adjusted section on the basis of the determined calculation method. Next, the speed adjustment unit 14 adjusts the adjusted speed in the identified speed-adjusted section to the calculated adjusted speed.

According to the speed adjustment device 1 according to the present embodiment operating as described above, the adjusted speed for the driving axis in the speed-adjusted section can be automatically adjusted, on the basis of the tool being used, and the shape of the workpiece and the path data in the speed-adjusted section, by referring to the stored information that is stored in advance in the storage unit 11. Specifically, in a drilling process, the feedrate in the bite portion and the breakthrough portion can be automatically adjusted. Therefore, according to the present embodiment, an appropriate adjusted speed in the speed-adjusted section can be automatically determined, and burring and tool damage can be inhibited without unduly extending cycle time.

It should be noted that the present disclosure is not limited to the aspect described above, and that the present disclosure includes variants and modifications within the scope capable of achieving the purpose of the present disclosure.

In the embodiment described above, a drilling process wherein a drill is used was described as an example, but the present disclosure is not so limited. For example, the present disclosure may be applied to a turning process or a milling process.

In addition, in the embodiment described above, the speed adjustment device 1 is provided to a numerical control device and configured to override the machining program by determining an adjusted speed and performing speed adjustment, but the present disclosure is not so limited. For example, the present disclosure may be configured such that an adjusted speed is determined when an interactive programming software or a CAM generates the machining program, and is reflected in the machining program. In other words, the speed adjustment device 1 (without the speed adjustment unit 14, however) may be provided to a CAM or a program generation device, or another external device, instead of the numerical control device.

In addition, a suggestion unit that suggests the adjusted speed calculated by the adjusted speed calculation unit 13 as a recommended adjusted speed may be provided. Thus, for example, after a user has confirmed the recommended adjusted speed suggested by the suggestion unit, the speed adjustment may be executed in accordance with an input by the user.

EXPLANATION OF REFERENCE NUMERALS

1 Speed adjustment device
11 Storage unit
12 Speed-adjusted section identification unit
13 Adjusted speed calculation unit
14 Speed adjustment unit
15 Distribution processing unit for interpolation movement command
16 Acceleration/deceleration start position calculation unit
17 Movement command output unit

18 Acceleration/deceleration processing unit
19 Servo control unit
20 Servo motor
T Tool
W Workpiece

The invention claimed is:

1. A speed adjustment device for adjusting a speed of a driving axis of a machine tool that performs a drilling process on a workpiece using a tool, the speed adjustment device comprising:
a processor configured to:
store a calculation method for an adjusted speed of the driving axis in a speed-adjusted section, the adjusted speed being determined in accordance with a tool being used, a shape of the workpiece in the speed-adjusted section, and path information;
identify the speed-adjusted section and the shape of the workpiece in the speed-adjusted section on the basis of shape data of the workpiece and the path information; and
determine the calculation method for the adjusted speed of the driving axis in the speed-adjusted section on the basis of tool data, the shape of the workpiece in the speed-adjusted section identified, the path information, and stored information, and calculate the adjusted speed in the speed-adjusted section on the basis of the determined calculation method,
wherein the speed adjustment device identifies, as the shape of the workpiece in the speed-adjusted section, a machining path of a drilling cycle obtained from a machining program and a shape of a surface of the workpiece including an intersection with the machining path.

2. The speed adjustment device according to claim 1, wherein the processor is configured to set the adjusted speed in the speed-adjusted section to the adjusted speed.

3. The speed adjustment device according to claim 2, wherein the processor is configured to suggest the adjusted speed as a recommended adjusted speed.

4. The speed adjustment device according to claim 1, wherein the processor is further configured to suggest the adjusted speed as a recommended adjusted speed.

* * * * *